United States Patent [19]

Lucht

[11] Patent Number: 4,728,140
[45] Date of Patent: Mar. 1, 1988

[54] MEANS FOR SHIELDING A TRUCK MOUNTED AERODYNAMIC DRAG REDUCER

[76] Inventor: James P. Lucht, 834 Hidden Hills Dr., Bellevue, Nebr. 68005

[21] Appl. No.: 48,637

[22] Filed: May 11, 1987

[51] Int. Cl.$^4$ ............................................. B62D 35/00
[52] U.S. Cl. ......................................................... 296/1 S
[58] Field of Search ........................ 296/1 S; 280/402

[56] References Cited

U.S. PATENT DOCUMENTS

| | | | |
|---|---|---|---|
| 3,999,796 | 12/1976 | Greene | 296/1 S |
| 4,141,580 | 2/1979 | Ivan | 296/1 S |
| 4,156,543 | 5/1979 | Taylor | 296/1 S |
| 4,375,898 | 3/1983 | Stephens | 296/1 S |
| 4,379,583 | 4/1983 | Taylor et al. | 296/1 S |
| 4,408,792 | 10/1983 | Sullivan | 296/1 S |
| 4,509,786 | 4/1985 | Gregg | 296/1 S |

*Primary Examiner*—Robert R. Song
*Attorney, Agent, or Firm*—Zarley, McKee, Thomte, Voorhees & Sease

[57] ABSTRACT

A vertically adjustable mast is removably positioned behind the cab of the truck which is to be towed. The lower end of the mast is mounted on the frame members of the truck frame. A pair of wing members are pivotally mounted on the upper end of the mast to permit the wing members to be folded into an inoperative position or folded outwardly to an operative position. A flexible, substantially wedge-shaped air deflector is operatively secured to the upper end of the mast and extends rearwardly and downwardly therefrom for connection to the truck so that air will be prevented from entering into the interior of the drag reducer mounted on the truck roof when the truck is being towed rearwardly.

13 Claims, 6 Drawing Figures

MEANS FOR SHIELDING A TRUCK MOUNTED AERODYNAMIC DRAG REDUCER

BACKGROUND OF THE INVENTION

Aerodynamic drag reducers such as disclosed in U.S. Pat. Nos. 3,972,556 and 4,245,862 are mounted on the roof of a truck to deflect air upwardly over the top and around the sides of a trailer connected to the truck. The air deflectors of Mason and Buckley are removably mounted on the truck roof by means of brackets. Although both the Mason and Buckley devices do reduce the drag of the trailer, the open rearward ends thereof create a serious problem should it be necessary to tow the truck, without the trailer, rearwardly if the truck should become disabled. As the truck is being towed rearwardly, the air enters the interior of the drag reducer and can pull the drag reducer from its mounting brackets or can pull the mounting brackets from the truck roof. One current method of reducing the amount of air entering the air deflectors is to strap or otherwise secure a sheet of plywood or the like across the rearward end of the drag reducer. However, the bluff shape of the sheet of plywood also imposes considerable forces on the drag reducer and its mounting brackets since a sheet of plywood not deflect the air around the drag reducer but simply prevents the air from entering the interior of the drag reducer.

It is therefore a principal object of the invention to provide a means for shielding a truck mounted aerodynamic drag reducer.

A further object of the invention is to provide a means for shielding a truck mounted aerodynamic drag reducer which may be quickly and easily removably mounted on the truck should it be necessary to tow the truck in a rearward manner.

Yet another object of the invention is to provide a means for shielding a truck mounted aerodynamic drag reducer which may be telescoped and folded into a compact size for storage when not in use.

Still another object of the invention is to provide a means for shielding a truck mounted aerodynamic drag reducer which is economical of manufacture, durable in use and refined in appearance.

These and other objects will be apparent to those skilled in the art.

SUMMARY OF THE INVENTION

Figure 1:
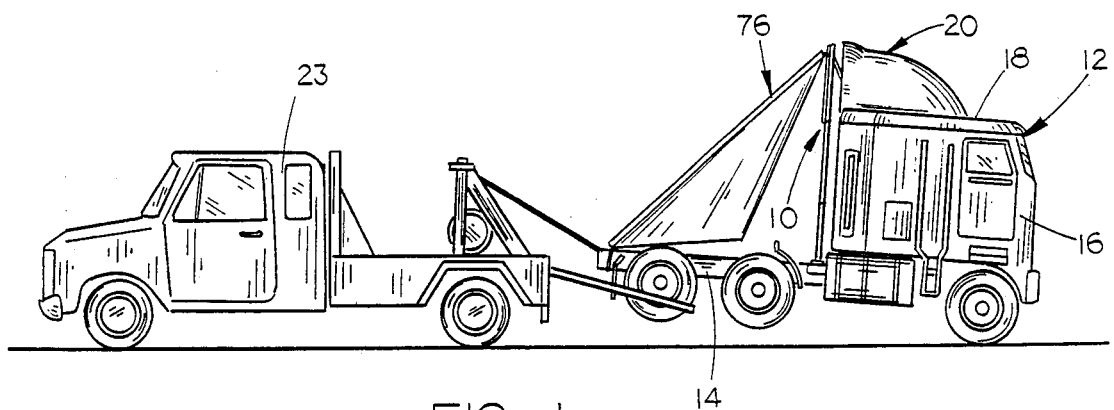
FIG. 1 is a side view illustrating a tow truck pulling a disable truck rearwardly with the shielding means of this invention being mounted on the towed truck.

The device of this invention is designed to be removable mounted on the truck frame rearwardly of the cab. The device comprises a vertically adjustable mast having its lower end positioned on the longitudinally extending frame members of the truck. The upper end of the mast is provided with a pair of wing members which may be pivotally moved outwardly so as to be positioned rearwardly of the rearward end of the aerodynamic drag reducer mounted on the truck roof. The upper end of the mast is operatively secured to the truck roof and to the truck frame so as to be positioned in its vertically disposed position. A flexible, substantially wedge-shaped deflector is operatively secured to the mast and to the truck so that air will be prevented from entering the open rearward end of the aerodynamic drag reducer when the truck is being towed rearwardly.

DESCRIPTION OF THE PREFERRED EMBODIMENT

The shielding apparatus of this invention is referred to generally by the reference numeral 10 while the reference numeral 12 refers to a conventional tractor or truck including a wheeled frame means 14 having a cab 16 mounted thereon which includes a roof 18. An aerodynamic drag reducer 20 is mounted on the roof 18 of cab 16 to deflect air upwardly over the top and around the sides of the trailer normally being pulled by the truck 12. As seen in the drawings, drag reducer 20 includes an open rearward end 22. Should it be necessary to tow the truck rearwardly, air will enter the open rearward end 22 of the drag reducer 20 which subjects the drag reducer, its mounting brackets and the truck roof to dangerous forces which can result in the drag reducer 20 being torn from its mounting brackets or resulting in the mounting brackets being torn from the truck roof.

To prevent damage to the roof 18 and to the drag reducer 20, the shielding apparatus 10 would be carried by a tow truck 23' so that it may be utilized should it be necessary to tow the truck 12 rearwardly. Shielding apparatus 10 includes a vertically adjustable support means or mast 24 having a pair of angle brackets 26 and 28 mounted at the lower end thereof which are adapted to be positioned on the longitudinally extending frame members 30 and 32 respectively.

Figure 2:
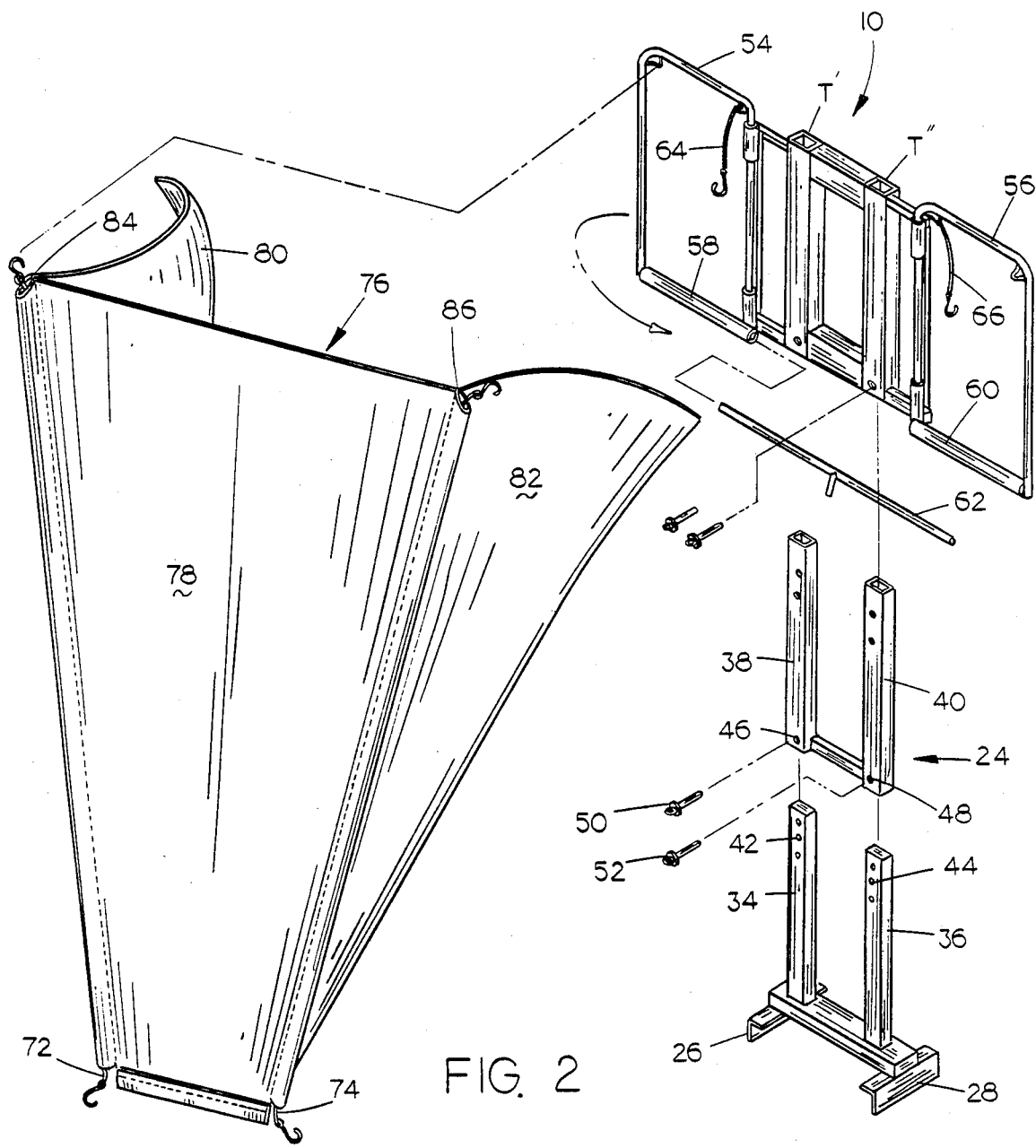
FIG. 2 is an exploded perspective view of the means for shielding a truck mounted aerodynamic drag reducer.
Figure 3:
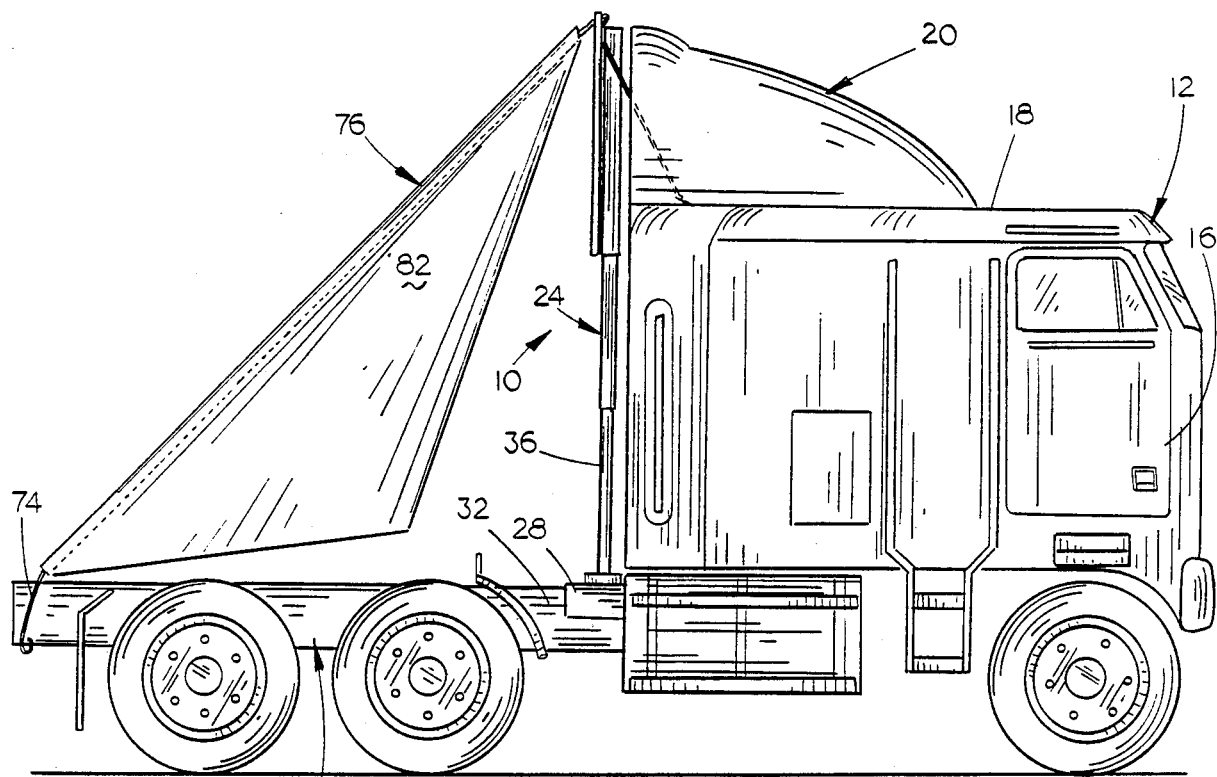
FIG. 3 is a side view of the means of this invention mounted on the truck to be towed.
Figure 4:
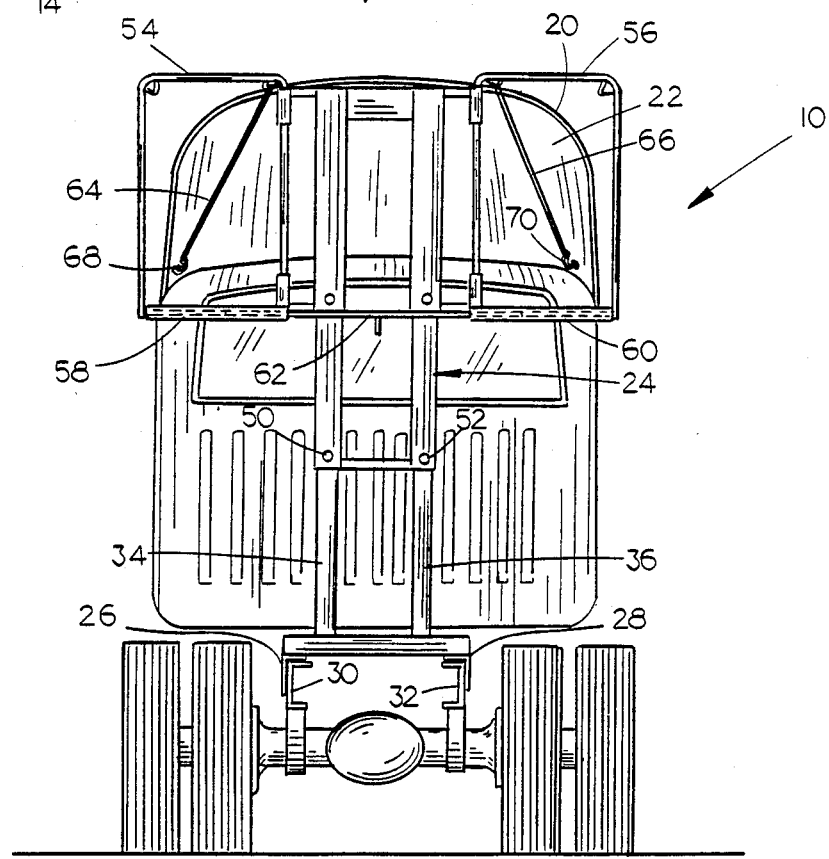
FIG. 4 is a rear view of the truck which is to be towed having the mast mounted thereon.
Figure 5:
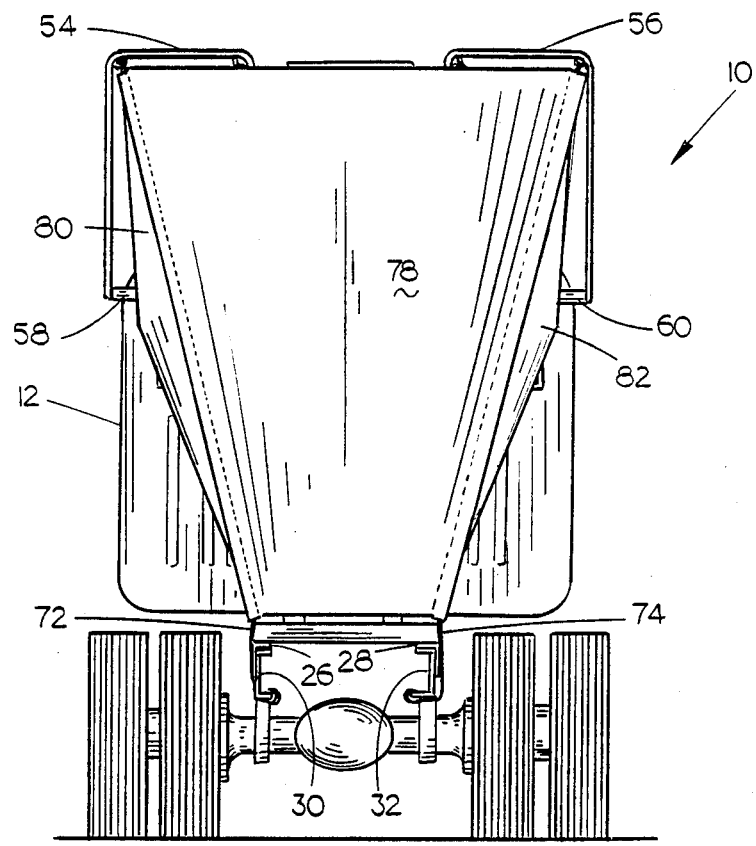
FIG. 5 is a view similar to FIG. 4 except that the deflector has been mounted on the mast.

Mast 24 preferably includes at least a pair of upstanding posts 34 and 36 which are selectively telescopically received by tubular members 38 and 40 respectively. Posts 34 and 36 are provided with a pair of vertically spaced openings 42 and 44 respectively which are adapted to register with the openings 46 and 48 in tubular members 38 and 40 respectively to enable the vertical adjustment of the tubular members 38 and 40 with respect to the posts 34 and 36 and to enable the assembly to be reduced to a convenient size for storage. As seen in the drawings, pins 50 and 52 extend through the openings 46 and 48 and into one of the respective openings 42 and 44. Tubular members 38 and 40 are selectively telescopically received by the tubular members T' and T" as seen in FIG. 2.

A pair of wing members 54 and 56 are selectively pivotally mounted at the upper end of the mast 24 so that they may be moved from a folded position to an outwardly extending position as illustrated in the drawings. Wing members 54 and 56 are provided with tubular portions 58 and 60 at the lower ends thereof respectively which are adapted to receive a retaining rod 62 to maintain the wing members 54 and 56 in their outwardly extending position during periods of use.

A pair of elastic shock cords 64 and 66 are secured to wing members 54 and 56 respectively and extend forwardly therefrom for connection to a pair of brackets 68 and 70 secured to the truck roof within the interior of drag reducer 20 as seen in the drawings. A pair of elastic shock cords 72 and 74 are also secured to wing members 54 and 56 respectively and extend downwardly and rearwardly therefrom for detachable connection to the truck frame.

A substantially wedge-shaped deflection means 76 is operatively secured to the mast 24 and to the truck, when the mast is in position, to prevent air from entering the open rearward end of the drag reducer 20 when the truck is being towed rearwardly. Deflection means 76 includes a truncated V-shaped center portion 78 having substantially triangular shaped side portions 80 and 82 positioned on opposite sides thereof. Preferably center portion 78 is joined to side portions 80 and 82 in such a manner so as to create elongated casements 84 and 86 respectively through which the cords 72 and 74 extend.

Figure 6:
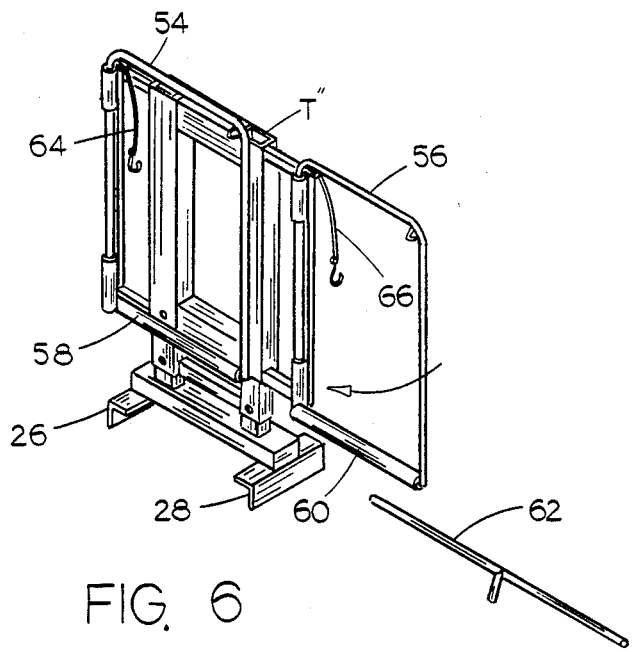
FIG. 6 is a perspective view illustrating the mast in a telescoped and semi-folded condition.

When the apparatus is not being used, the deflection means 76 will be folded and stored. The mast 24 will be telescoped to its shortest length (FIG. 6) and the rod 62 removed from tubular portions 58 and 60 to enable the wing members 54 and 56 to be folded inwardly adjacent the mast. When it is necessary to tow the truck 12 rearwardly, mast 24 is extended to the desired length depending upon the particular truck on which it is to be mounted. The brackets 26 and 28 are positioned on the frame members 30 and 32 and the cords 64 and 66 are secured to brackets 68 and 70. The deflection means 76 is then positioned rearwardly of the mast 24 in the manner illustrated in the drawings so that the hook portions on the upper ends of cords 72 and 74 may be secured to the wing members 54 and 56 respectively. The lower ends of the cords 72 and 74 are then hooked or secured to the truck frame in any convenient manner. The side portions 80 and 82 are also secured to the truck in any convenient fashion so as to create the wedge shape seen in the drawings. Thus, when the truck is pulled rearwardly, the deflection means 76 deflects the air upwardly over the rearward end of the drag reducer and around the sides of the drag reducer to prevent air from entering the interior thereof. The wedge shape of the deflection means also aids in limiting the aerodynamic forces being applied to the mast 24.

Thus it can be seen that the apparatus of this invention accomplished at least all of its stated objectives.

I claim:

1. In combination,
    a truck comprising a wheeled frame means having rearward and forward ends, a cab mounted on said wheeled frame means at the forward end thereof and including a roof, and an aerodynamic drag reducer mounted on the cab roof and extending upwardly therefrom,
    an upstanding support means removably positioned behind the cab and having upper and lower ends,
    the lower end of said support means being operatively secure to said wheeled frame means, the upper end of said support means being positioned rearwardly of said drag reducer,
    and an air deflection means operatively secured to said support means for preventing air from striking the rearward end of said drag reducer when said truck is being towed in a rearward manner.

2. The combination of claim 1 wherein said support means is selectively vertically adjustable.

3. The combination of claim 1 wherein the upper end of said support means is selectively foldable from an inoperative position to an operative position.

4. The combination of claim 1 wherein said air deflection means is flexible.

5. The combination of claim 4 wherein said air deflection means is substantially wedge shaped.

6. In combination with a truck comprising a wheeled frame means having rearward and forward ends, a cab mounted on said wheeled frame means at the forward end thereof and including a roof, and an aerodynamic drag reducer mounted on the cab roof and extending upwardly therefrom, comprising,
    an upstanding support means selectively removably positioned behind the cab and having upper and lower ends,
    the upper end of said support means being positioned rearwardly of said drag reducer,
    and an air deflection means operatively secured to said support means for preventing air from striking the rearward end of said drag reducer when said truck is being towed in a rearward manner.

7. The apparatus of claim 6 wherein the lower end of said support means is mounted on said wheeled frame means.

8. The combination of claim 6 wherein said support means is selectively vertically adjustable.

9. The combination of claim 7 wherein the upper end of said support means is selectively foldable from an inoperative position to an operative position.

10. The combination of claim 7 wherein said air deflection means is flexible.

11. The combination of claim 10 wherein said air deflection means is substantially wedge shaped.

12. In combination,
    a truck, comprising a wheeled frame means having rearward and forward ends, a cab mounted on said wheeled frame means at the forward end thereof and including a roof, and an aerodynamic drag reducer mounted on the cab roof and extending upwardly therefrom,
    an aerodynamically shaped air deflection means positioned rearwardly of said drag reducer for preventing air from striking the rearward end of said drag reducer when said truck is being towed in a rearward manner,
    and means for supporting and positioning said air deflection means rearwardly of said drag reducer.

13. The combination of claim 12 wherein said air deflection means is substantially wedge shaped.

* * * * *